G. F. KROLLPFEIFFER.
Sled.

No. 72,303.  Patented Dec. 17, 1867.

Witnesses:  
Theo Fischl  
Wm Dean Overell

Inventor:  
G. F. Krollpfeifer  
Per Munn & Co  
Attorneys

United States Patent Office.

GEORGE F. KROLLPFEIFFER, OF NEW YORK, N. Y.

Letters Patent No. 72,303, dated December 17, 1867.

IMPROVEMENT IN SLEDS.

The Schedule referred to in these Letters Patent and making part of the same.

TO ALL WHOM IT MAY CONCERN:

Be it known that I, GEORGE F. KROLLPFEIFFER, of the city, county, and State of New York, have invented certain new and useful Improvements in Land Conveyance; and I do hereby declare that the following is a full, clear, and exact description thereof, which will enable others skilled in the art to make and use the same, reference being had to to accompanying drawings, forming part of this specification.

The present invention relates to an attachment for sleds, sleighs, and other classes of land conveyance, whereby the sled or sleighs can be propelled over the ground or other surface, by means of the direct action upon the ground of a lever or levers, so hung to the body of the sled or other vehicle as to be suitably operated by a person or persons within the same, or by other power, either hand or mechanical. In the accompanying plate of drawings my improvements in land conveyance, are illustrated—

Figure 1:

Figure 1 being a side view or elevation of a sled or sleigh, having my driving-attachment applied thereto.

Figure 2:
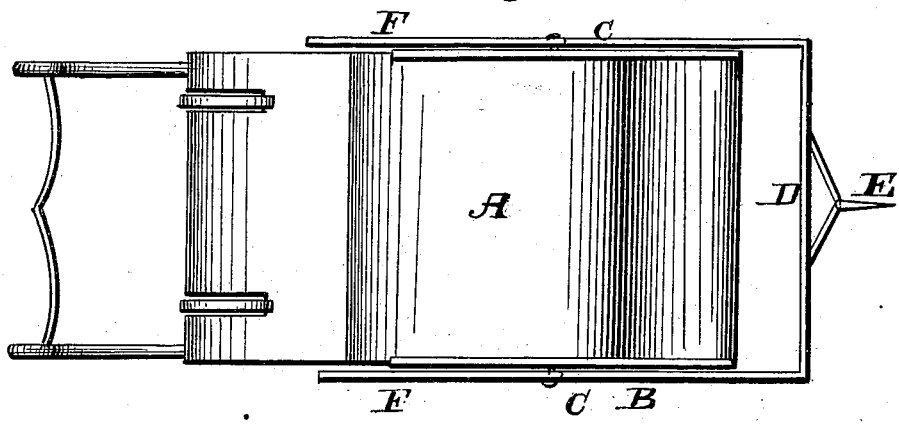

Figure 2, a plan or top view of the sled, with its attachment for propelling the same.

Similar letters of reference indicate corresponding parts.

A represents a sled or sleigh, the construction of which may be similar to any of the ordinary or common styles of sleds or sleighs. B, a frame, consisting of two rods or bars, C, joined together at one end by a cross-bar, D, and hung upon a fulcrum at E of the sled, with the handle-ends F to the frame toward the front part of the sled, and its cross-bar D to the back or rear side thereof. To this cross-bar D, a lever or pick, E, is hung, so as to swing thereon, and thus by properly operating the handles F, brought to bear on the ground or other surface for propelling or forcing the sled along over the same, as is obvious.

I claim as new, and desire to secure by Letters Patent—

The attachment to sleds, sleighs, and other land conveyances, consisting of a pivoted frame, B, rod E, and handles F, substantially as and for the purpose described.

The above specification of my invention, signed by me, this     day of August, 1867.

G. F. KROLLPFEIFFER.

Witnesses:
ALBERT W. BROWN,
ALEX. F. ROBERTS.